US006954898B1

(12) United States Patent
Nakai et al.

(10) Patent No.: US 6,954,898 B1
(45) Date of Patent: Oct. 11, 2005

(54) METHOD OF STANDARDIZING CHARACTER INFORMATION IN ELECTRONIC DOCUMENTS

(75) Inventors: Haruhiko Nakai, Kawasaki (JP); Akio Kido, Tokyo (JP); Yoshihiko Enomoto, Shiroyama-machi (JP); Tetsuji Orita, Yokohama (JP)

(73) Assignee: International Business Machines Corporation, Armonk, NY (US)

( * ) Notice: Subject to any disclaimer, the term of this patent is extended or adjusted under 35 U.S.C. 154(b) by 0 days.

(21) Appl. No.: 09/539,025

(22) Filed: Mar. 30, 2000

(30) Foreign Application Priority Data

Jul. 23, 1999 (JP) ................................. 11-209094

(51) Int. Cl.[7] ............................................. G06F 15/00
(52) U.S. Cl. ...................................... 715/542; 715/530
(58) Field of Search ............................... 345/468, 471; 1/471; 715/542, 530; 358/1.11

(56) References Cited

U.S. PATENT DOCUMENTS

| 5,167,013 | A | * | 11/1992 | Hube et al. ................. 358/1.11 |
| 5,257,323 | A | * | 10/1993 | Melen et al. ................. 382/310 |
| 5,506,940 | A | * | 4/1996 | Bamford et al. ........... 358/1.11 |
| 5,859,648 | A | * | 1/1999 | Moore et al. ................. 345/471 |
| 6,038,575 | A | * | 3/2000 | Jensen et al. ............... 715/542 |
| 6,073,148 | A | * | 6/2000 | Rowe et al. ................. 715/542 |
| 6,360,223 | B1 | * | 3/2002 | Ng et al. ..................... 707/100 |
| 6,389,178 | B1 | * | 5/2002 | Agazzi et al. ............... 382/276 |
| 6,426,751 | B1 | * | 7/2002 | Patel et al. ................. 345/468 |

FOREIGN PATENT DOCUMENTS

| JP | 121513 | 5/1995 | ........... G06F 17/21 |
| JP | 141337 | 6/1995 | ........... G06F 17/21 |
| JP | 271777 | 10/1995 | ........... G06F 17/21 |
| JP | 7319854 | 12/1995 | ........... G06F 71/21 |
| JP | 320171 | 4/1998 | ............. G06F 5/00 |

OTHER PUBLICATIONS

IBM Technical Disclosure Bulletin, Jun. 1993, "Item-Mapping Subsystem", pp. 553-556.*
Microsoft Corporation, "Microsoft Word: User's Guide" 1993-1994, Microsoft Press, Version 6.0, pp. 48-50.*

* cited by examiner

Primary Examiner—Stephen Hong
Assistant Examiner—Jonathan D. Schlaifer
(74) Attorney, Agent, or Firm—Yee & Associates, P.C.; A. Bruce Clay

(57) ABSTRACT

Character information is standardized in electronic documents. By comparing a font used in an electronic document and a font within a target font set to be provided as a replacement font, a font comparison table referred to during actual font replacement is automatically generated. The font comparison table is presented to the user, in order for the user to amend errors in the comparison table. The font in the electronic document is replaced based on the amended font comparison table.

10 Claims, 1 Drawing Sheet

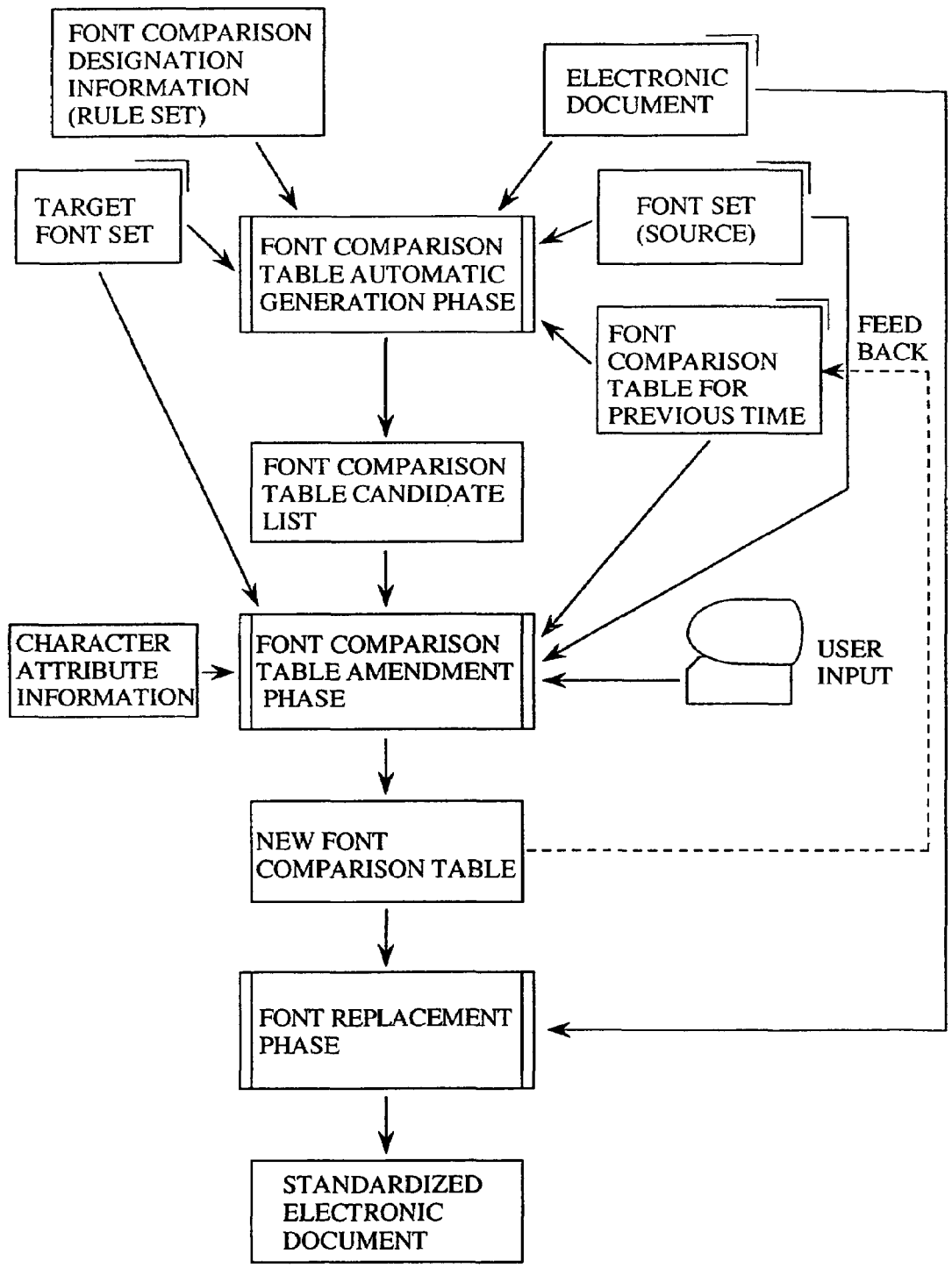

METHOD OF STANDARDIZING CHARACTER INFORMATION IN ELECTRONIC DOCUMENTS

FIELD OF THE INVENTION

The present invention relates to a method of standardizing character information in an electronic document by replacing characters utilizing a non-standard font set in the electronic document with characters from a corresponding standard font set.

BACKGROUND OF THE INVENTION

Conventionally, the choosing of fonts used in an electronic document is entrusted to the person producing such a document. Fonts installed in electronic document processing equipment such as word processors, etc. differ from machine to machine, and such machines are usually limited to only being able to handle a specific language. Producers of documents who wish to produce a document containing a number of languages or who wish to use characters not included on a basic font set, therefore, have to define the font for such characters as external characters in order to use such fonts in an electronic document. This is not much a problem during the exchange of documents printed on paper but has become a major drawback with the proliferation of exchanging electronic documents over the internet and during registration of electronic documents in electronic libraries.

Producers and readers of electronic documents have to have the same font sets and character codes in order to reliably exchange character information. However, considering the current situation in which the font sets that can be used on each platform are different, in formats used in exchange of information such as formats passed over internet lines and formats for data stored in centralized files within an electronic library or within a company, standardization of standard fonts used for character information is necessary.

Font replacement has been possible in related electronic document production systems but in this replacement, the character code information is saved as is and just the font information is replaced with another font. For example, external character fonts are usually defined as independent fonts, with it then being usual to decide an index of characters from the order of definition of the characters. Font replacement cannot, therefore, be carried out even when large font sets such as, for example, the Unicode font which includes all of the principle characters from around the world (including the JIS supplementary kanji set spanning several thousand words that are not supported by usual electronic document production systems), are used because the character indexes within the fonts (character coding) are different.

A user would need to manually change code values for character code within an electronic document when replacing fonts. In order to achieve this, the user would need to know the font index used in the original electronic document and the index of the characters corresponding to the characters to be replaced. When electronic documents are accumulated in an electronic library, the number of producers of accumulating documents is an ever-increasing large number. Due to the storage of font sets used in all of the documents, and the storage of the indexes of the characters within the font sets, manual standardization of the documents one at a time is practically impossible.

As a result, with electronic libraries handling character information of electronic documents and centralized files within companies in the related art, the only option has been to accumulate documents as they are made, with attempts at standardization of electronic documents being basically abandoned. Unintelligible characters therefore occur because of the differences between the font environments of producers and users of the electronic documents. This causes inconvenience when exchanging an electronic document and means that displaying and processing of electronic documents made by other systems cannot be carried out by systems limited to Tier-O resources, etc. In Japanese Patent Laid-open Publication No. Hei. 7-319854, there is disclosed an external character management system for making and distributing external character font files in an effective manner. However, this technology is for managing external fonts in closed network environments and cannot be applied as is to the standardization of character information in electronic documents that is the object of the present invention.

SUMMARY OF THE INVENTION

It is an object of the present invention to provide a method of standardizing character information occurring in electronic documents. The method is capable of standardizing fonts used in accumulation and conversion of information for electronic documents made using a variety of fonts that differ for each platform or electronic document production system without detriment to the quality of the information.

The present invention relates to a method of standardizing character information in an electronic document by replacing characters utilizing a non-standard font set in the electronic document with characters from a corresponding font set. The present invention is a method of standardizing character information in electronic documents, comprising the steps of: comparing a font used in an electronic document and a font within a target font set to be provided as a replacement font in order to generate a font comparison table referred to during actual font replacement by: presenting an automatically generated font comparison table to the user and having the user amend errors in the comparison table; and actually replacing the font in the electronic document based on the amended font comparison table.

According to the present invention, conversion of electronic documents made using external characters to a standard font set such as, for example, the Unicode font and conversion of electronic documents containing some foreign language sections is possible, and conversion and accumulation of information for similar characters and foreign language documents is possible.

In a preferred example of the present invention, an electronic document constituting a source, a font set used in the electronic document, a target font set for carrying out standardization, a comparison table made in a previous conversion, and font object information describing a rule set limiting objects of character comparison and a rule set relating to mapping for each kanji radical are input and a font comparison table candidate list is output in the step of automatically generating the font comparison table. Weighting information regarding mapping between similar characters can also be output as a reference file. The font comparison table candidate list is a list taking as elements groups comprising one character within a source font and a plurality of characters within a target font compatible with the source font. Priority level information can be added for the plurality of characters within the target font. The font comparison table can be a list taking as elements a corresponding relationship between a group of a source font set and character code within this source font set and a group of a target font set and character code within this target font set. Any of these cases can be applied to the step of automatically generating the font comparison table.

In a preferred example of the present invention, font comparison in the step of automatically generating the font comparison table can be carried out automatically using Optical Character Recognition (OCR) technology. Further, the step of amending errors in the font comparison table can be a process where a candidate list for the font comparison table is displayed for every entry and the user selects one character from the candidate list. The font comparison table and a rule set describing a structure of a source electronic document are input and standardization of fonts and character code used in the source electronic document can be carried out in the font replacement step. The font set to be provided as a replacement can be a font set of the Unicode font. The present invention is suitable for application in any of these cases.

BRIEF DESCRIPTION OF THE DRAWING

For a more complete understanding of the present invention and for further advantages thereof, reference is now made to the following Detailed Description taken in conjunction with the accompanying drawing, in which:

The FIGURE is a flowchart illustrating the concept of the method of standardizing character information occurring in electronic documents of the present invention.

DETAILED DESCRIPTION OF THE INVENTION

The present invention will now be described in accordance with the FIGURE. First, a font comparison table automatic generation step to automatically generate a font comparison table to be referenced during actual font replacement is executed by comparing fonts used in the electronic document and characters (fonts) within the font set to be replaced so as to make a candidate list for the font comparison table. Next, the automatically generated font comparison table is presented to the user, the user executes a font comparison table amendment phase for amending errors in the font comparison table, and a new font comparison table is made. Finally, a font replacement phase for actually replacing fonts in the electronic document based on the amended new font comparison table is executed and a standardized electronic document is obtained.

The method of standardizing character information in electronic documents of the present invention can be utilized in such fields as: electronic libraries, document management systems, intermediate servers supporting hand-held devices (pervasive computing environment) such as PDAs, web publishing, and web browsers, etc. A case where an electronic document including external characters made by a user is standardized to a Unicode font is now considered. In this case, it is necessary for the user to standardize not just the external characters independently defined by the user into Unicode, but to also standardize the regular characters into Unicode. Since a font index comparison table exists for regular characters between the fonts of the electronic document already made by the user, for example, between MS mincho and Unicode fonts, standardization can be carried out in a straightforward manner based on this comparison table.

The present invention can also be utilized for standardization of external characters. First, the font comparison table automatic generation phase is executed for each external font, and a matching or similar Unicode font is obtained for each external font so that a candidate list for the font comparison table is temporarily made as the font comparison table. The candidate list for the font comparison table is usually a plurality of Unicode fonts for each external character. Next, the font comparison table amendment phase is executed, with the font comparison table amendment list being provided to the user, and the user amends errors in the comparison table, i.e. the user selects one font from the candidate list and when there is no Unicode font corresponding to an external character, a similar Unicode font is allotted and registered as a Unicode font external character. Unicode also supports several thousand JIS supplemental kanji so that almost all external characters made by a user can be made to correspond to Unicode fonts. Finally, the font replacement phase for actually replacing fonts in the electronic document is executed based on the revised font comparison table and an electronic document standardized to the Unicode font can be obtained.

The details of each phase are described in the following.

(1) The Font Comparison Table Automatic Generation Phase:

In this phase, a rule set relating to the electronic document that is the source document, the font set used in this electronic document, the target font set for carrying out standardization, a comparison table made in the conversion thereafter, rule sets limiting the objects of character comparisons and mapping for each kanji radical ("one stroke radical" and "two stroke radical", whether or not certain sections of the kanji are split, and other aspects that determine whether or not a character is determined to be the same radical or a different radical, or different character) are input as the aforementioned font comparison designation information and a font comparison table candidate list is output. In the preferred implementation of this invention, weighting information for mapping between similar characters evaluated in the execution of this phase is output as a reference file and can be referred to during the next execution.

The font comparison table is a list that takes as its elements the corresponding relationship between a group of a source font set and character code in the font set (font index) and a group of a target font set and character code for corresponding characters within this font set. Font comparison indication information comprises information designating a font group showing which font set of which source corresponds to which font set of which target and which characters within a source font set are to undergo comparisons, and a font group constituting comparisons within the target font. The font comparison table candidate list is a list taking groups of one character within the source font and a plurality of characters within the target font that can correspond to this one character as elements. In this preferred implementation of the present invention, priority level information is added to characters in the target font in order to help to define the font comparison table manually in the next phase.

Character comparison is carried out by the following procedure using OCR technology.

① Making patterns for groups of characters to be compared from the target font set.

② Picking out one character from the electronic document and checking its code value.

③ If the code value is for the character that is the target of the pattern information comparison;

A. Make the pattern for this character from the source font set.

B. Compare the obtained pattern with the pattern for the group obtained in ① and add a group for a similar pattern to the comparison table candidate list. In this preferred implementation, priority level information within the candidate list is added at this time.

④ The process in ② and ③ is repeated.

(2) The Font Comparison Table Amendment Phase:

In this phase, the candidate list for the font comparison table obtained in the previous phase and the font comparison table obtained as a result of previous execution of this phase are input and a final font comparison table is output. This phase is principally a process where the candidate list for the font comparison table obtained in the previous phase is displayed for each entry, with the user then selecting one from the list. In the preferred implementation of the present invention, when the candidate selected by the user conflicts with an entry in the font comparison table made in previous processing, or when multi/single or single/multi mapping is designated by the user, the processing system of this phase informs the user of this using a warning, so that the user can reconsider. Further, the preferred implementation of the present invention may also possess a function for displaying the attributes of candidate characters (character name, character meaning, character type, and other information that may be referred to in specifying characters) while presenting the candidate list for the font comparison table to the user.

(3) The Font Replacement Phase:

The font comparison table that is the output of the previous phase, the rule set describing the structure of the electronic source document and the rule set describing the structure of the target electronic document (which may be the same format as the source) are input and the fonts and character code used in the source electronic document are standardized. Conversion of the format of the electronic document can also be carried out simultaneously in this phase when the format and structure of the electronic document differ between the source and target.

In addition to being capable of standardizing fonts used in accumulation and conversion of information for electronic documents made using a variety of fonts that differ for each platform or electronic document production system without detriment to the quality of the information, the present invention can also be used to obtain the various objects described in the following:

(1) Character code for electronic documents made using various character code can easily be made to conform to the internet standard document description language such as XML by conversion to the internet standard, universally understood character code, Unicode, and electronic documents can then be published on the WEB.

(2) The efficiency of information retrieval in electronic libraries and of centralized files in corporations can be improved by standardizing character code for electronic documents made using various character codes to specific character code.

(3) Electronic documents can be displayed using similar characters even in environments that do not have fonts used in information exchange by reversely converting electronic documents accumulated and exchanged using standardized character code and character fonts to character code and fonts characteristic to this client environment.

(4) The efficiency of information processing in a client environment can be increased by reversely converting electronic documents accumulated and exchanged using standardized character code and character fonts to character code and fonts specific to that client environment.

(5) User workload can be substantially reduced as a result of semi-automation of comparison tables referred to during standardization of character code and fonts, and the amount of work required to standardize the documents can be reduced to a more practical level.

6) When, for example, a Tier-O system, where there are few resources (when there are few fonts or when there are no conversion tables and functions in order to process a document from character code for an original electronic document to character code for this system in an effective manner), is to display and process a document made in another system, changing of the format of electronic documents to a format that can be processed in a client environment is carried out by entrusting standardization of a document to be optimized to the client environment with few resources, to an intermediate server in the access path during accessing of this electronic document.

(7) The efficiency of automatic generation of a comparison table for character codes and fonts can be improved by replacing fonts and character codes, which in the related art could only be replaced independently, while referring to a separate document that was previously standardized.

(8) The possibility of making mistakes while mapping can be reduced by making use of past mapping experience by automatically generating character code and a font mapping table while referring to a separate document standardized in the past. The following cases can be considered as the causes of mapping mistakes:

When a plurality of similar characters similar in form exist in the target font set, there is the possibility that the wrong character will be mapped or that inconsistencies may occur in the font mapping.

There is the possibility that more than one character may be mapped for one target character when a plurality of similar characters similar in form exist in the source font set.

(9) Comparison of characters (fonts) within the source and target font sets for which mapping has previously been defined can be avoided by specifying font groups for automatically carrying out character comparisons.

(10) As comparison of characters (fonts) within the source and target font sets for which mapping has already been defined previously can be avoided by specifying font groups for automatically carrying out character comparisons, the danger of comparison tables that the user did not intend to be generated being generated (for example, a JIS X0208 level 1 JIS character being mapped as a JIS X0208 level 2 character) is reduced.

(11) The extent to which the accuracy of mapping is reduced due to comparison of fonts of different type faces by defining target fonts for comparing specific fonts included in the source can be lowered.

(12) The introduction of linguistic rules is possible during automatic generation of the comparison table by noting the relationship between the language and the font sets used by the language. In this way characters that are the object of conversion obtained by comparing character information are taken to be words connected to the previous and following characters and the accuracy of automatic generation of the comparison tables can be improved.

As becomes clear from the above description, according to the present invention, conversion of electronic documents made using external characters to a standard font set such as, for example, the Unicode font and the conversion of electronic documents containing some foreign language sections is possible and conversion, and accumulation of information for similar characters and foreign language documents is possible.

What is claimed is:

1. A computer-implemented method of standardizing character information in electronic documents comprising the steps of: comparing character information including character code and font information for each character used in an electronic document to character information within a target replacement font set in order to automatically generate a comparison table for use during actual character information replacement; presenting said comparison table to a user; said user amending errors in said comparison table; and actually replacing said character information including character code and font information used in said electronic document based on said comparison table as amended.

2. The method of standardizing character information in electronic documents of claim 1, wherein said step of comparing further comprises:
   inputting an electronic source document;
   inputting a font set used in said electronic source document;
   inputting a target standardization font set;
   inputting a comparison table made in a previous conversion;
   inputting font object information to describe a rule set to limit objects of character comparison and a rule set related to mapping for each kanji radical; and
   outputting a comparison table candidate list.

3. The method of standardizing character information in electronic documents of claim 2, further comprising the step of:
   outputting weighting information regarding mapping between similar character codes as a reference file.

4. The method of standardizing character information in electronic documents of claim 2, wherein said comparison table candidate list takes as elements groups comprising one character code within a source font and a plurality of character codes within a target font compatible with said source font.

5. The method of standardizing character information in electronic documents of claim 4, further comprising adding priority level information for said plurality of character codes within said target font.

6. The method of standardizing character information in electronic documents of claim 1, wherein the comparison table is a list taking as elements a corresponding relationship between a group of a source font set and character code within this source font set and a group of a target font set and character code within this target font set.

7. The method of standardizing character information in electronic documents of claim 1, wherein said step of comparing is carried out automatically using Optical Character Recognition (OCR) technology.

8. The method of standardizing character information in electronic documents of claim 1, wherein said step of amending error in said comparison table further comprises the steps of:
   displaying a candidate list for the comparison table for every entry; and
   said user selecting one character code from said candidate list.

9. The method of standardizing character information in electronic documents of claim 1, wherein a comparison table and a rule set describing a structure of a source electronic document are input and standardization of fonts and character code used in said source electronic document are carried out in said step of replacing said character information.

10. The method of standardizing character information in electronic documents of claim 1, wherein said font set to be provided as a replacement font is a font with Unicode encoding.

* * * * *